United States Patent [19]

Gray

[11] 3,905,392

[45] Sept. 16, 1975

[54] ALARM CHECK VALVE

[75] Inventor: Robert J. Gray, Raynham, Mass.

[73] Assignee: Hodgman Manufacturing Co., Inc., Taunton, Mass.

[22] Filed: July 29, 1974

[21] Appl. No.: 492,509

[52] U.S. Cl. ........ 137/557; 137/516.11; 137/525.3; 137/512.4
[51] Int. Cl.² ..................... F16K 37/00; F16K 15/14; F16K 15/00; F16K 21/04
[58] Field of Search............ 137/557, 512.4, 516.11, 137/525, 525.3

[56]  References Cited
UNITED STATES PATENTS

| | | | |
|---|---|---|---|
| 3,448,766 | 6/1969 | Schule | 137/512.15 X |
| 3,838,708 | 10/1974 | Schule | 137/516.11 |

*Primary Examiner*—Henry T. Klinksiek
*Attorney, Agent, or Firm*—Kenway & Jenney

[57] ABSTRACT

An alarm clock valve for use in an automatic sprinkler system has an apertured cone-shaped support member mounted within a section of pipe, a resilient diaphragm that seats on the interior surface of the support member to permit a flow of water in only one direction, and outlet means for directing a portion of the flow to sound an alarm. In one form, the support member has a flanged portion formed at its base and the outlet means is an annular groove formed on the interior surface of the flanged portion. In another form, the outlet means is an annular chamber formed by a sealing member that extends between the exterior surface of the support member and interior surface of the pipe. In the latter form, water enters the chamber through at least one aperture located in the portion of the support member forming a wall of the chamber. During a flow of water through the valve, a portion of the flow enters the groove or chamber and exits through an alarm outlet port that is in fluid communication with a retard chamber venting to atmosphere and a water motor that activates the alarm.

16 Claims, 6 Drawing Figures

ALARM CHECK VALVE

BACKGROUND OF THE INVENTION

This invention relates in general to valves and more specifically to alarm check valves for use in automatic sprinkler systems.

Automatic sprinkler systems that maintain a water-filled condition, commonly termed "wet" systems, frequently employ a check alarm valve at a point intermediate a water main and a network of graduated piping and associated sprinkler heads that extends throughout the building serviced by the system. The checking feature of the alarm check valve serves to prevent the water from draining out of the system when the pressure in the main falls or fails. Also, during pressure surges, more water is forced into and retained in the network through a compression of residual air. The alarm feature of the alarm check valve serves to sound an alarm whenever there is a sustained heavy water flow through the valve indicative of a fire in the building. A small portion of the water flow to the sprinklers is diverted through an auxilliary outlet port to a water motor that activates the alarm. Additionally, the alarm system is usually designed to bleed to atmosphere some of the water flow induced by a pressure surge or other light or transient flows, without sounding the alarm.

Conventional alarm check valves have a heavy cast iron body and a brass clapper that seats over an inlet passage formed in the body. A water flow to the sprinkler system lifts the clapper from the valve seat, and a reverse flow seats the clapper and reliably closes the valve. One arrangement for splitting off a portion of the flow to the alarm outlet port is to have an extension of the clapper seat over the auxilliary port as the main clapper assembly seats over the inlet passage. Through a proper design of these elements, the valve opens within a desired low pressure differential, sounds an alarm during a sustained heavy flow associated with one or more of the sprinkler heads opening in response to a fire, and vents or bleeds off a light or transient flow to atmosphere without sounding the alarm.

These conventional alarm check valves, however, suffer from several significant disadvantages. First the cast iron forgings and the brass used in their manufacture are becoming increasingly costly and less available. Second they are extremely cumbersome and heavy devices. For example, a typical 8 inch valve weighs approximately 250 pounds. Because of their size and weight, installation and maintenance operations are relatively slow and costly. Third, the moving metallic parts of the conventional valves are subject to a steady deterioration due to wear and corrosion.

It is therefore a principal object of this invention to provide an alarm check valve that opens in response to a low pressure differential, reseats reliably when the flow stops, and diverts a portion of the flow to sound an alarm or to bleed off transient pressure surges, but uses no cast iron forgings or brass in its manufacture and has a weight that is only a small fraction of that of conventional alarm check valves.

Another object of this invention is to provide an alarm check valve having these advantages that also employs no clapper or other moving metallic parts and is highly corrosion and wear resistant.

Still another object of this invention is to provide an alarm check valve that significantly reduces the costs and difficulties of manufacture, installation and maintenance.

SUMMARY OF THE INVENTION

An alarm check valve constructed according to this invention has an apertured support member and a mating, resilient, movable diaphragm, both of which preferably have a generally conical shape. The support member is mounted at its base, preferably by means of a flanged portion, to the interior of a section of pipe supplying water to an automatic sprinkler network. Outlet means located near the junction of the support member and the piping, and sealed from water adjacent the upstream or inlet side of the support member, provides a fluid path for splitting off part of any fluid flow through the valve, whether transient or sustained, and directing it via an alarm outlet port to a water motor alarm. The outlet means can be an annular groove formed in the support member and lying under the diaphragm. Alternatively, the outlet means can be an annular dead space or chamber formed between the interior surface of the pipe, the upstream or outwardly facing surface of the support member, and a sealing member that extends between these two surfaces. In the latter form, the wall of the chamber formed by the support member contains at least one aperture.

DETAILED DESCRIPTION OF THE PREFERRED EMBODIMENTS

Figure 1:
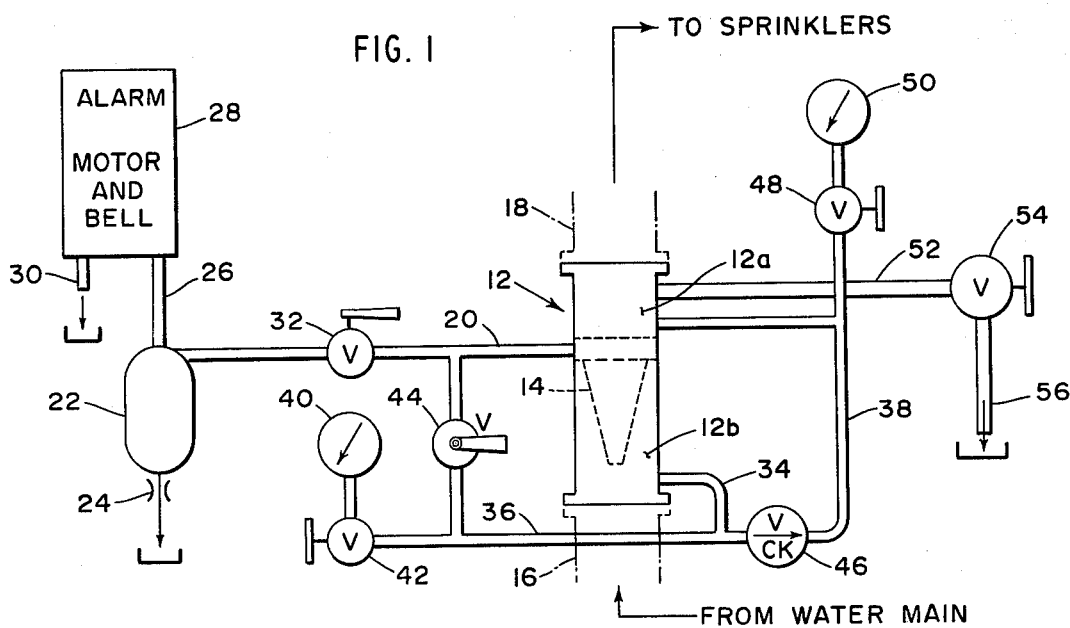
FIG. 1 is a schematic representation of an alarm check valve constructed according to this invention and its associated operational trim.

FIG. 1 shows an alarm check valve 12 having a checking assembly 14 (shown in phantom) coupled at its lower end to a pipe 16 leading to a water main and coupled at its upper end to a pipe 18 leading to an automatic sprinkler network. Under normal operating conditions, the pipes 14 and 16 and valve 12 are all filled with water at a pressure determined primarily by the pressure in the main. The assembly 14 allows the water to flow from the main to the sprinklers, but prevents a reverse flow.

Conduit 20 is in fluid communication with a downstream portion or side 12a of the valve 12, in a manner which will be described more fully hereinbelow, so as to receive a portion of any flow of water through the valve 12. A retard chamber 22 having a restricted drain opening 24 at its lower end receives the water carried by the conduit 20. Conduit 26 is in fluid communication between the upper end of the retard chamber 22 and a water motor activated alarm 28. The interior volume of the chamber 22 and the flow rate of the opening 24 are selected so that the water flow induced in the conduit 20 by a transient pressure surge in the main and the pipe 16 will drain to atmosphere through the opening 24 without activating the alarm 28. However, if the flow through the valve 12 is heavy and sustained, as is the case when one or more sprinklers opens in response to a fire, the chamber 22 quickly fills with water thereby forcing the water flowing in the conduit 20 to enter the conduit 26 and operate the alarm 28, after which it is discharged from a drain 30. A normally open valve 32 in the conduit 20 may be closed for the repair or replacement of the retard chamber, the alarm or the associated trim.

With further reference to FIG. 1, conduit 34 directs water from a upstream or supply portion or side 12b of the valve 12 into conduits 36 and 38. A gauge 40 is provided to measure the downstream water pressure when a valve 42 is open. A normally closed valve 44, connected between conduits 36 and 20 opens manually to test the alarm system. The conduit 38 provides a bypass of the check valve 12 to act in cooperation with the conduit 20 and retard chamber 22 to pass a certain amount of water, as during a pressure surge, without sounding the alarm 28. The conduit 38 also serves to ensure a maximum water flow from the main to the sprinklers during a fire. A check valve 46 in the conduit 38 prevents the water in the sprinkler network from draining back into the pipe 16 during a pressure drop or failure. A valve 48 in the conduit 38 opens to measure the water pressure of the sprinkler network on a guage 50. Conduit 52, gate valve 54 and drain 56 provide a convenient means for draining the sprinkler network.

Figure 3:
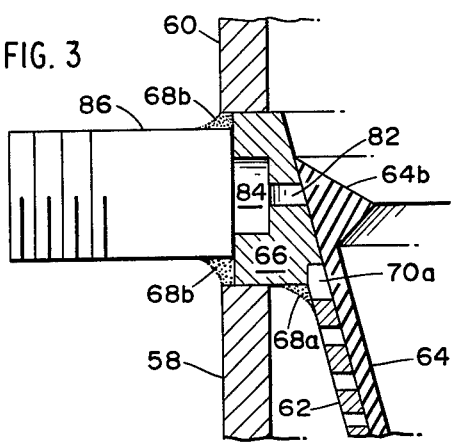
FIG. 3 is a detailed view of the groove outlet means shown in FIG. 2.
Figure 2:
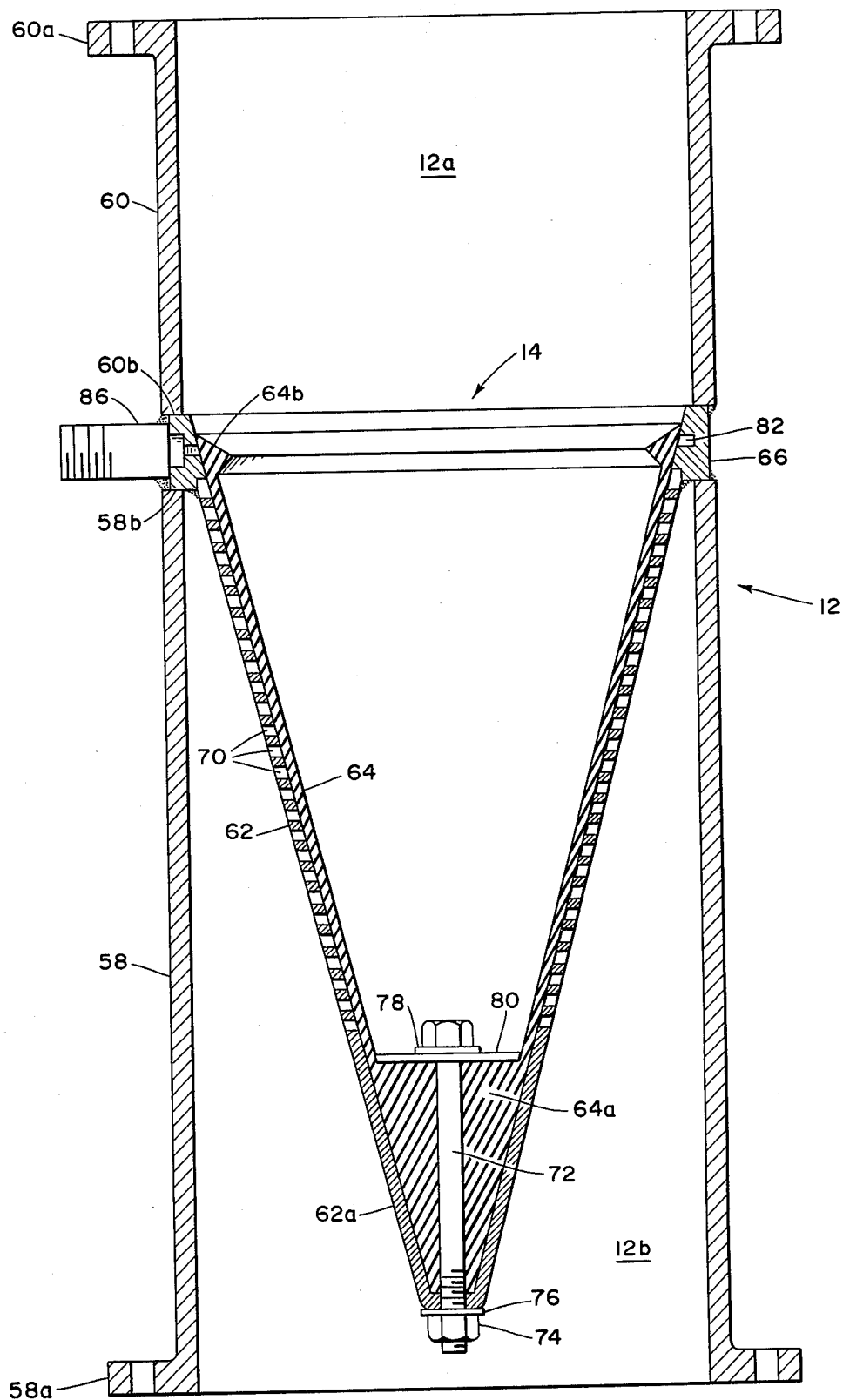
FIG. 2 is an enlarged sectional view of the check alarm valve shown in FIG. 1.

FIGS. 2 and 3 illustrate in greater detail the valve 12. Wall sections 58 and 60 couple to the pipes 16 and 18, respectively, by means of flanges 58a and 60a of conventional design. The wall sections 58 and 60 are preferably formed by cutting a single length of standard flanged steel pipe in any convenient plane parallel to the planes of the flanges 58a and 60a.

The checking assembly 14 is to the type described in British Pat. No. 1,357,249 to J. H. Waters, and has a support member or cone 62 and a mating resilient diaphragm 64, both of which preferably have a generally conical shape. The cone 62 is mounted at its base to the walls 58 and 60 by means of a flanged neck portion 66 that is attached to the open base end of the cone by any suitable means such as a weld 68a (FIG. 3). In the illustrated embodiment the flanged portion is sandwiched between the abutting ends 58b and 60b of the wall sections 58 and 60. The flanged portion 66 is preferably mounted to the wall sections by welds 68b (FIG. 3). The cone 62 has a plurality of apertures 70 formed therein, except for a section 62a adjacent to the apex of the cone.

The apertures 70 are preferably circular in shape and are closely spaced to offer minimum resistance to a fluid flow through the apertures. The cone 62 and its associated neck portion 66 therefore serve to subdivide the valve 12 into the downstream 12a adjacent the interior surface of the cone and the upstream side 12b adjacent the exterior surface of the cone. They also block any movement of water between the two sides 12a and 12b except through the apertures 70.

The diaphragm 64 is disposed within the cone 58 so that in its normal or "relaxed" position, illustrated in FIGS. 2 and 3, it covers all of the aperture 70 and thereby blocks a flow of water therethrough. The diaphragm is essentially a thin cone of a water-impervious, resilient material that is preferably non-corrosive and establishes a good seal with the inner surface of the cone 62. A recommended material is natural rubber. The cone 62 can be constructed from any suitable structural material that is preferably non-corrosive. Suitable materials include stainless steel or a properly coated mild steel. The diaphragm is attached to the cone by a threaded bolt 72 that extends through a longitudinally oriented central passage in a solid tip portion 64a of the diaphragm and the apex or tip of the cone section 62a. A nut 74 threaded on the end of the bolt 72, and the associated washers 76, 78 and plate 80 serve to secure the mounting.

In operation, the cone and diaphragm block or check a flow of water from the portion 12a to the portion 12b. If the water pressure in the portion 12a is greater than or substantially equal to the water pressure in the section 12b, this pressure differential seats the diaphragm firmly on the cone. On the other hand, if the pressure in the valve portion 12b exceeds the pressure in the portion 12a by a certain minimal threshold value, then the diaphragm moves off of the cone and allows a flow of water through the apertures 70. When the pressure is again substantially equalized, as for example, at the end of a pressure surge, the diaphragm automatically, reliably and silently reseats on the cone due to its inherent tendency to assume its normal or "relaxed" position (FIGS. 2 and 3). This shut off action is aided by the thickened and feathered design of the free edge 64b of the diaphragm.

Figure 4:
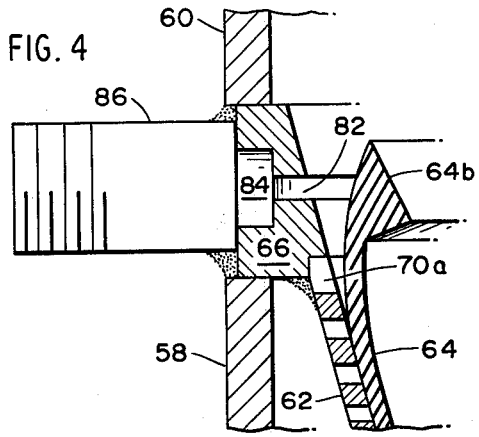
FIG. 4 is detailed view corresponding to FIG. 3 showing the diaphragm in an unseated condition associated with a light water flow through the valve.

In the opening cycle, the initial opening movement or "cracking", of diaphragm, illustrated in FIG. 4, occurs equally readily at any point along the circumference of the edge portion 64b. Under conditions other than a light flow, other portions of the diaphragm will also move quickly off of the cone to open more apertures 70. Under heavy flow conditions, the diaphragm 64 pleats into a small number of lobes, usually four, and is spaced from all of the apertures 70.

A principal feature of this invention is an annular groove 82 (FIG. 2–4) formed in the flanged neck portions 66, that provides an outlet means to the conduit 20 and the alarm 28. The groove 82 extends outwardly from the inner, downstream surface 66a of the neck, positioned under the edge 64b of the diaphragm. The groove 82 is isolated from water on the upstream side of the valve so that it receives a flow of water only when the diaphragm moves off at least one of the apertures 70 to allow a water flow through the valve 12 to the sprinkler network. Since the groove 82 is annular, the flow into the groove is independent of the circumferential position at which the diaphragm initially cracks. The groove directs any inflow to an alarm outlet port 84 which is essentially a cylindrical chamber extending between the outer surface of the neck 66 and the outer edge surface of the groove 82. The port 84 in turn directs the fluid flow split off by the groove 82 to a threaded nipple 86 which forms the first portion of the conduit 20. As shown in FIGS. 3 and 4, welds 68b can also serve to attach the nipple 86 to the neck 66.

Figure 5:
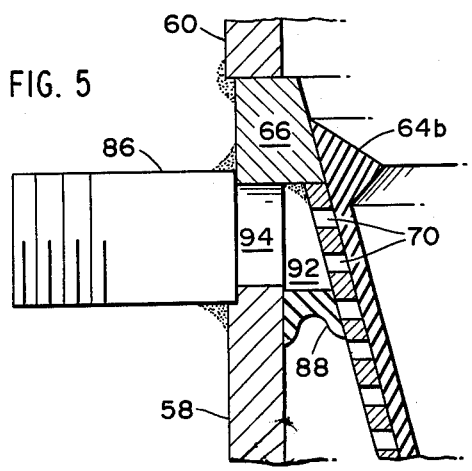
FIG. 5 illustrates an alternative outlet means employing a gasket sealing member.
Figure 6:
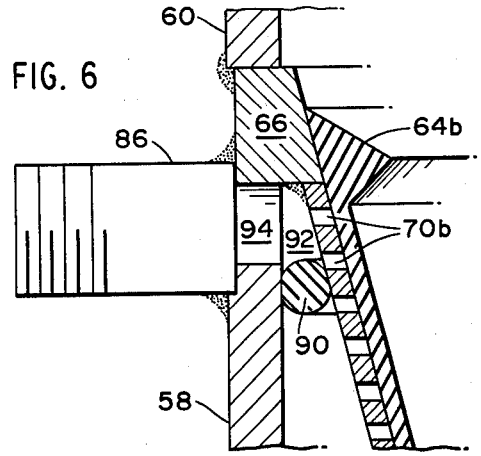
FIG. 6 illustrates the alternative outlet means shown in FIG. 5 utilizing an O-ring sealing member.

FIGS. 5 and 6 illustrate alternative outlet means for diverting a portion of a fluid flow passing through the valve 12 to the alarm 28. Rater than channeling the fluid flow through the neck portion 66, these arrangements provide a sealing member, shown in FIG. 5 as a gasket 88 and in FIG. 6 as an O-ring 90, that creates an annular dead space or chamber 92 defined by the upper surface of the sealing member 88 or 90, a portion of the interior surface of the wall section 58, and a portion of the exterior surface of the cone 62 (including the flanged neck portion of the cone). The chamber is thus isolated from the water on the upstream 12b of the valve. The chamber 92 communicates with the apertures 70b (proximate to the neck portion 66) and an alarm outlet port 94 formed in the valve wall section 58. The port 94 corresponds to the port 84 shown in FIGS. 2–4. During a flow through the valve 12, a portion of the flow enters the chamber 92 through the apertures 70b and exits the chamber via the port 94 and the nipple 86 to enter the conduit 20.

Although the cone 62 has been described as mounted by welding a flanged portion 66 between abutting wall or pipe sections 58 and 60, any suitable mounting method can be used. For example, the edge of the cone can be welded to the interior surface of a single section of pipe, or the flanged portion can be mounted with gaskets between opposed flanges similar in construction to flanges 58a or 60a. Still further, the cone can have threaded cylindrical extension that mounts in a treaded ring sealed to the interior surface of the pipe. It is only essential that the mounting prevent any appreciable flow of water from the valve portion 12b to the valve portion 12a except through the apertures 70. In certain of these embodiments, it may be preferable to fashion the cone from alternative materials such as polypropylene.

The structure of the outlet means can also vary. The groove 82 and chamber 92 can assume a variety of cross sectional shapes, and the sealing member may consist of any of a wide range of devices. One such arrangement is a metal collar that is welded between the interior surface of the wall section and the exterior surface of the cone. Similarly, the alarm outlet port may consist of more than one passage, or a single passage of alternative design.

The dimensions of the various elements discussed above depend on factors such as the size of the sprinkler network, the flow rates, operating pressures, and operating standards established by the appropriate fire insurance underwriters organizations, particularly with regard to selecting a minimal flow rate that will sound the alarm 28 during a fire but not during flows due to transient pressure surges. Common diameters for the pipe sections 58 and 60 are 6 and 8 inches, but this dimension, for automatic sprinkler systems, can range from 2 to 24 inches.

Although this invention has been described with reference to an alarm check valve for an automatic sprinkler system, the invention can be applied to any fluid system where it is desired to maintain a one-way fluid flow and simultaneously split off a portion of that flow to an auxilliary system. Similarly the invention can be used in conduits of a variety of materials, shapes, and orientations. For example, the embodiments described above can be used in curving pipes or fittings or straight pipes having a non-vertical spatial orientation.

Thus there has been described a low weight, corrosion resistant and highly reliable alarm check valve that utilizes no forgings or brass in its construction and has no clapper or moving metallic parts. The valve, as it operates effectively and silently over a wide range of flow conditions, offers a low flow resistance, and has a minimum of maintenance needs. Still further, the valve is comparatively easy to manufacture, install and repair.

For example, an alarm check valve constructed according to this invention in the commonly used 8 inch size weighs about 30 pounds and is easily handled and installed by one person.

Having thus described in detail the preferred embodiments of the invention, what is claimed is:

1. An alarm check valve comprising, in combination,
    a conduit,
    an apertured support member engaged at its periphery to the interior surface of said conduit section, said support member having a curved interior surface facing at least partially in a first direction along the longitudinal axis of the conduit section, and an exterior surface opposite said interior surface,
    resilient means mated to the interior surface of said support member and movable off of said interior surface to allow a fluid flow through the valve only in said first direction, and
    outlet means in fluid communication between a portion of said interior surface and said alarm, said outlet means being sealed from fluid in the valve adjacent to the exterior surface of said support member.

2. An alarm check valve according to claim 1 in which said support member and said mating resilient means have a generally conical shape.

3. An alarm check valve according to claim 1 in which said support member has a flanged portion that mounts said support member to said conduit section.

4. An alarm check valve according to claim 3 in which said outlet means comprises an annular groove formed on the interior surface of said flanged portion.

5. An alarm check valve according to claim 1 in which said outlet means comprises an annular chamber defined by a portion of the exterior surface of said support member, a portion of the interior surface of said conduit section adjoining said support member portion and a sealing member disposed therebetween, said exterior surface portion having formed therein at least one of said apertures.

6. An alarm check valve according to claim 5 in which said sealing means is an O-ring.

7. An alarm check valve according to claim 5 in which said sealing means is a gasket.

8. An alarm check valve according to claim 1 further comprising port means formed in said conduit section and in fluid communication between said outlet means and the alarm.

9. An alarm check valve according to claim 1 further comprising means for venting a light fluid flow to atmosphere without sounding the alarm.

10. An alarm check valve for use in an automatic sprinkler system comprising, in combination,
    a pipe,
    a support member having a generally conical shape and engaged at its open end to the interior surface of said pipe, the interior surface of said support member facing at least partially in a first direction along the longitudinal axis of said pipe, said support member having a plurality of apertures formed therein and extending between said interior surface and the exterior surface of said support member,
    resilient means mated to the interior surface of said support member and movable off of said interior surface to allow a water flow through said pipe and said apertures only in said first direction, outlet means having a generally annular shape and in fluid communication with the interior surface of said support member said outlet means being sealed from the water adjacent to the exterior surface of said support member, and port means in fluid communication between said outlet means and the alarm.

11. An alarm valve according to claim 10 in which said outlet means comprises a groove formed on the interior surface of said flanged portion.

12. An alarm valve according to claim 10 in which said outlet means is a chamber defined by a portion of the exterior surface of said support member that is adjacent said pipe, a portion of the interior surface of said pipe adjoining said support member portion, and a sealing member disposed therebetween, said exterior surface portion having formed therein at least one of said apertures.

13. An alarm check valve according to claim 12 in which said sealing member is an O-ring.

14. An alarm check valve according to claim 12 in which said sealing member is a gasket.

15. An alarm check valve according to claim 10 in which said apertures have a generally circular shape.

16. An alarm check valve according to claim 10 in which said cage is manufactured from a non-corrosive structural material and said diaphragm is rubber.

* * * * *

UNITED STATES PATENT AND TRADEMARK OFFICE
CERTIFICATE OF CORRECTION

PATENT NO. : 3,905,392
DATED : September 16, 1975
INVENTOR(S) : Robert J. Gray

It is certified that error appears in the above-identified patent and that said Letters Patent are hereby corrected as shown below:

In the Abstract, line 1, "clock" should read --check--.

Column 2, line 36, insert --a-- after "is".

Column 3, line 29, "guage" should be --gauge--; line 39, "to" should be --of--.

Column 4, line 64, "Rater" should be --Rather--.

Column 5, line 5, add --side-- after "upstream"; line 23, "treaded" should be --threaded--.

In the Claims, claim 16, line 2 "cage" should be --support member--.

Signed and Sealed this sixth Day of January 1976

[SEAL]

Attest:

RUTH C. MASON
Attesting Officer

C. MARSHALL DANN
Commissioner of Patents and Trademarks